United States Patent
Marrack

(10) Patent No.: US 12,486,810 B1
(45) Date of Patent: Dec. 2, 2025

(54) DUAL FUEL SYSTEM AND METHOD FEEDING SAME FUEL AT TWO PRESSURES TO FUEL INJECTOR

(71) Applicant: Caterpillar Inc., Peoria, IL (US)

(72) Inventor: Andrew O. Marrack, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/733,122

(22) Filed: Jun. 4, 2024

(51) Int. Cl.
*F02D 19/06* (2006.01)
*F02M 43/04* (2006.01)
*F02M 47/02* (2006.01)

(52) U.S. Cl.
CPC ..... *F02D 19/0694* (2013.01); *F02D 19/0689* (2013.01); *F02D 19/0692* (2013.01); *F02M 43/04* (2013.01); *F02M 47/027* (2013.01)

(58) Field of Classification Search
CPC ............. F02D 19/0689; F02D 19/0692; F02D 19/0694; F02M 43/04; F02M 47/027
See application file for complete search history.

(56) References Cited

U.S. PATENT DOCUMENTS

| | | | | |
|---|---|---|---|---|
| 4,416,229 A | * | 11/1983 | Wood | F02M 43/00 123/304 |
| 4,499,861 A | * | 2/1985 | Wiegand | F02M 43/04 123/576 |
| 4,794,902 A | | 1/1989 | McKay | |
| 6,019,075 A | | 2/2000 | Galka et al. | |
| 6,336,598 B1 | * | 1/2002 | Touchette | F02M 21/0263 239/408 |
| 7,970,526 B2 | | 6/2011 | Ibrahim | |
| 8,897,995 B2 | | 11/2014 | Kurtz | |
| 11,384,721 B1 | | 7/2022 | Schroeder et al. | |
| 11,698,043 B1 | * | 7/2023 | Marrack | F02M 47/027 123/472 |

(Continued)

FOREIGN PATENT DOCUMENTS

| | | | |
|---|---|---|---|
| CN | 105422345 A | * | 3/2016 |
| CN | 105756825 A | | 7/2016 |

(Continued)

*Primary Examiner* — John M Zaleskas
(74) *Attorney, Agent, or Firm* — Brannon Sowers & Cracraft PC

(57) ABSTRACT

A fuel system includes a first fuel subsystem having a supply of a first fuel and at least one fuel pump to provide a high-pressure feed of a first fuel and a low-pressure feed of the first fuel. The fuel system also includes a second fuel subsystem having a supply of a second fuel, and a plurality of fuel injectors. Each fuel injector forms a high-pressure fuel inlet, a low-pressure fuel inlet, a second-fuel inlet, and a combined-fuel outlet passage. A first fuel admission valve is movable to admit the first fuel into the combined-fuel outlet passage displacing some of the second fuel to form a combined fuel charge. A second fuel admission valve admits the second fuel to the combined-fuel outlet passage. The first fuel may include a compression-admission fuel such as diesel, and the second fuel may include an alcohol fuel such as methanol. Providing the first fuel at two different fuel pressures enables the first fuel to serve lubrication and cooling purposes within fuel injector, whilst also providing a component of a segmented combined fuel charge or substantially all of a fuel charge.

19 Claims, 3 Drawing Sheets

(56) References Cited

U.S. PATENT DOCUMENTS

| | | | | |
|---|---|---|---|---|
| 11,773,792 B1* | 10/2023 | Coldren | | F02D 41/38 |
| | | | | 123/445 |
| 11,795,887 B1* | 10/2023 | Juchems | | F02D 41/20 |
| 12,297,795 B1* | 5/2025 | Schroeder | | F02M 47/027 |
| 2002/0070295 A1* | 6/2002 | Baker | | F02M 47/046 |
| | | | | 239/533.3 |
| 2003/0102452 A1* | 6/2003 | Ruthardt | | F02M 61/16 |
| | | | | 251/129.15 |
| 2004/0256495 A1* | 12/2004 | Baker | | F02M 61/182 |
| | | | | 239/533.2 |
| 2008/0103678 A1* | 5/2008 | Teraji | | F02B 23/0663 |
| | | | | 701/103 |
| 2009/0020631 A1* | 1/2009 | Mashida | | F02D 19/0694 |
| | | | | 239/533.3 |
| 2009/0150050 A1* | 6/2009 | Mashida | | F02D 19/061 |
| | | | | 251/12 |
| 2010/0199948 A1* | 8/2010 | Rogak | | F02D 19/0689 |
| | | | | 123/304 |
| 2011/0108631 A1* | 5/2011 | Mumford | | F02D 19/0689 |
| | | | | 239/429 |
| 2013/0081593 A1* | 4/2013 | Coldren | | F02M 63/0045 |
| | | | | 123/304 |
| 2013/0160741 A1* | 6/2013 | Sommars | | F02D 19/0647 |
| | | | | 123/456 |
| 2013/0213358 A1* | 8/2013 | Hou | | F02M 47/027 |
| | | | | 123/445 |
| 2013/0319373 A1* | 12/2013 | Brown | | F02M 21/0248 |
| | | | | 123/456 |
| 2015/0136072 A1* | 5/2015 | Kim | | F02M 63/029 |
| | | | | 123/299 |
| 2015/0369160 A1* | 12/2015 | Tanis | | F02M 61/04 |
| | | | | 239/5 |
| 2017/0159625 A1* | 6/2017 | Brasche | | F02M 37/0064 |
| 2019/0186448 A1* | 6/2019 | Mahmood | | F02M 51/061 |
| 2019/0345881 A1* | 11/2019 | Stanbridge | | F02D 41/0027 |
| 2020/0318569 A1* | 10/2020 | Lehman | | F02D 41/2487 |
| 2020/0386171 A1* | 12/2020 | Coldren | | F02M 59/265 |
| 2021/0148314 A1* | 5/2021 | Hou | | F02M 47/027 |
| 2021/0277856 A1* | 9/2021 | Mahmood | | F02M 51/061 |
| 2022/0243691 A1* | 8/2022 | Schroeder | | F02M 63/0043 |
| 2022/0290641 A1* | 9/2022 | Schroeder | | F02M 43/04 |
| 2023/0026883 A1* | 1/2023 | Hou | | F02M 21/0215 |
| 2023/0296070 A1* | 9/2023 | Marrack | | F02M 41/40 |
| | | | | 123/472 |
| 2024/0044308 A1* | 2/2024 | Schroeder | | F02D 19/0694 |
| 2025/0084813 A1* | 3/2025 | Coldren | | F02M 43/04 |

FOREIGN PATENT DOCUMENTS

| | | | | | |
|---|---|---|---|---|---|
| CN | 115419535 A | * | 12/2022 | | F02D 19/0644 |
| CN | 118008647 A | * | 5/2024 | | |
| DE | 10240879 A1 | * | 3/2004 | | F02M 47/027 |
| JP | 2022068869 A | * | 5/2022 | | F02D 19/0649 |
| WO | WO-2023280866 A1 | * | 1/2023 | | F02B 43/10 |

* cited by examiner

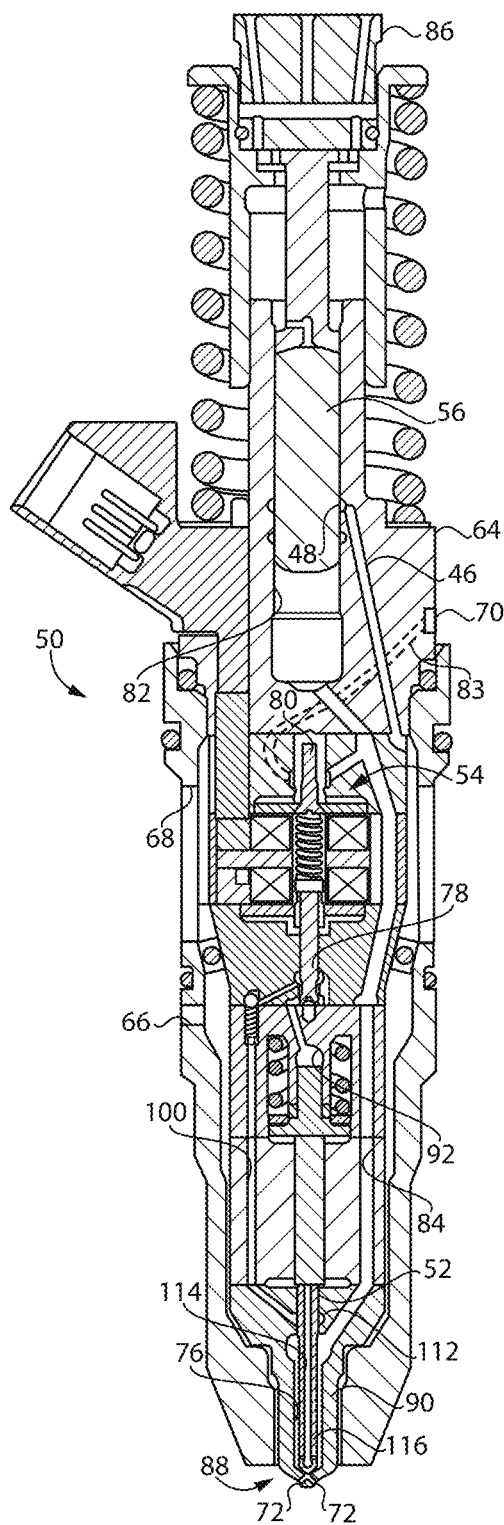
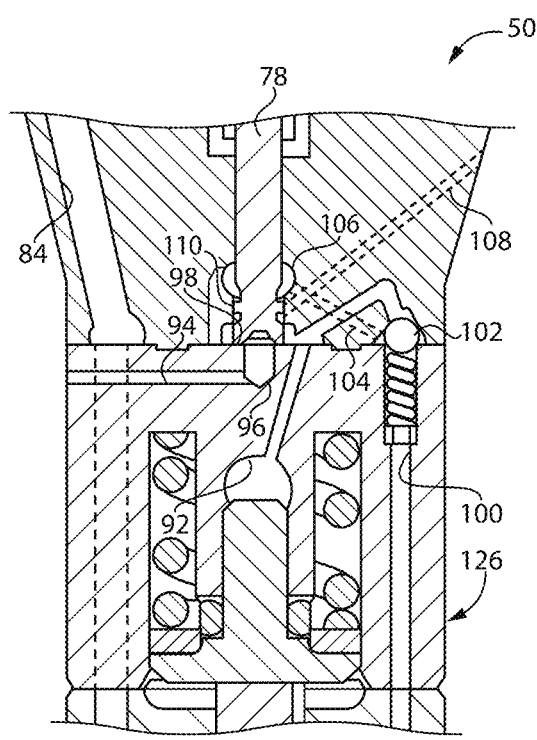
FIG. 2
FIG. 3

DUAL FUEL SYSTEM AND METHOD FEEDING SAME FUEL AT TWO PRESSURES TO FUEL INJECTOR

TECHNICAL FIELD

The present disclosure relates generally to a dual fuel system, and more particularly to feeding a first fuel and a second fuel to a fuel injector in a dual fuel system, with the first fuel supplied at two different pressures.

BACKGROUND

Dual fuel engine systems have been known for decades. While traditional engine systems typically utilize a single fuel type such as diesel, gasoline, or natural gas, in a dual fuel engine system two different fuels each having different desirable properties are typically combusted together in an engine cylinder.

In one known strategy, a relatively small pilot charge of a compression-ignition fuel such as diesel is used to ignite a relatively larger main charge of a gaseous fuel such as natural gas. The diesel fuel is relatively easily ignited by way of an increased temperature and pressure in a cylinder, with the ignition of the diesel fuel triggering ignition of the more difficult to ignite gaseous fuel.

More recently, engineers have proposed dual liquid fuel strategies employing a leading fuel and a trailing fuel, both in a liquid form and injected as a single fuel charge. U.S. Pat. No. 11,384,721 B1 proposes a strategy that may operate by injecting a first fuel and a second fuel from the same passage into an engine cylinder for combustion. While the '721 patent undoubtedly has practical applications, there is always room for improvement and development of alternative strategies.

SUMMARY

In one aspect, a fuel system includes a first fuel subsystem having a supply of a first fuel, at least one fuel pump, a high-pressure outlet conduit, and a low-pressure outlet conduit. The fuel system further includes a second fuel subsystem having a supply of a second fuel, and a fuel injector. The fuel injector forms a high-pressure fuel inlet fluidly connected to the high-pressure outlet conduit, a low-pressure fuel inlet fluidly connected to the low-pressure outlet conduit, a second-fuel inlet, and a combined-fuel outlet passage. The fuel injector further includes a first fuel admission valve for the first fuel movable between a closed position blocking the combined-fuel outlet passage from the high-pressure fuel inlet, and an open position, and a second fuel admission valve for the second fuel.

In another aspect, a method of operating a fuel system includes feeding a first fuel at a high pressure to a high-pressure fuel inlet of a fuel injector in a fuel system, and feeding the first fuel at a low pressure to a low-pressure fuel inlet of the fuel injector. The method further includes feeding a second fuel to a second-fuel inlet of the fuel injector, and operating a fuel admission valve to admit the first fuel to a fuel outlet passage in the fuel injector to form a fuel charge containing the first fuel. The method still further includes injecting the fuel charge into a cylinder in an engine for combustion.

In still another aspect, a fuel injector includes an injector housing forming a high-pressure fuel inlet, a low-pressure fuel inlet, a second-fuel inlet, and a plurality of nozzle outlets. The fuel injector further includes a nozzle check movable between a closed position blocking the plurality of nozzle outlets, and an open position, and a combined-fuel outlet passage formed between the nozzle check and the injector housing. The fuel injector further includes a first fuel admission valve movable between a closed position blocking the combined-fuel outlet passage from the high-pressure fuel inlet, and an open position, and a second fuel admission valve movable between a closed position blocking the combined-fuel outlet passage from the second-fuel inlet, and an open position.

BRIEF DESCRIPTION OF DRAWINGS

FIG. 2 is a sectioned side diagrammatic view of a fuel injector, according to one embodiment;

FIG. 3 is a sectioned side diagrammatic view of a portion of the fuel injector, as in FIG. 2.

DETAILED DESCRIPTION

Figure 1:
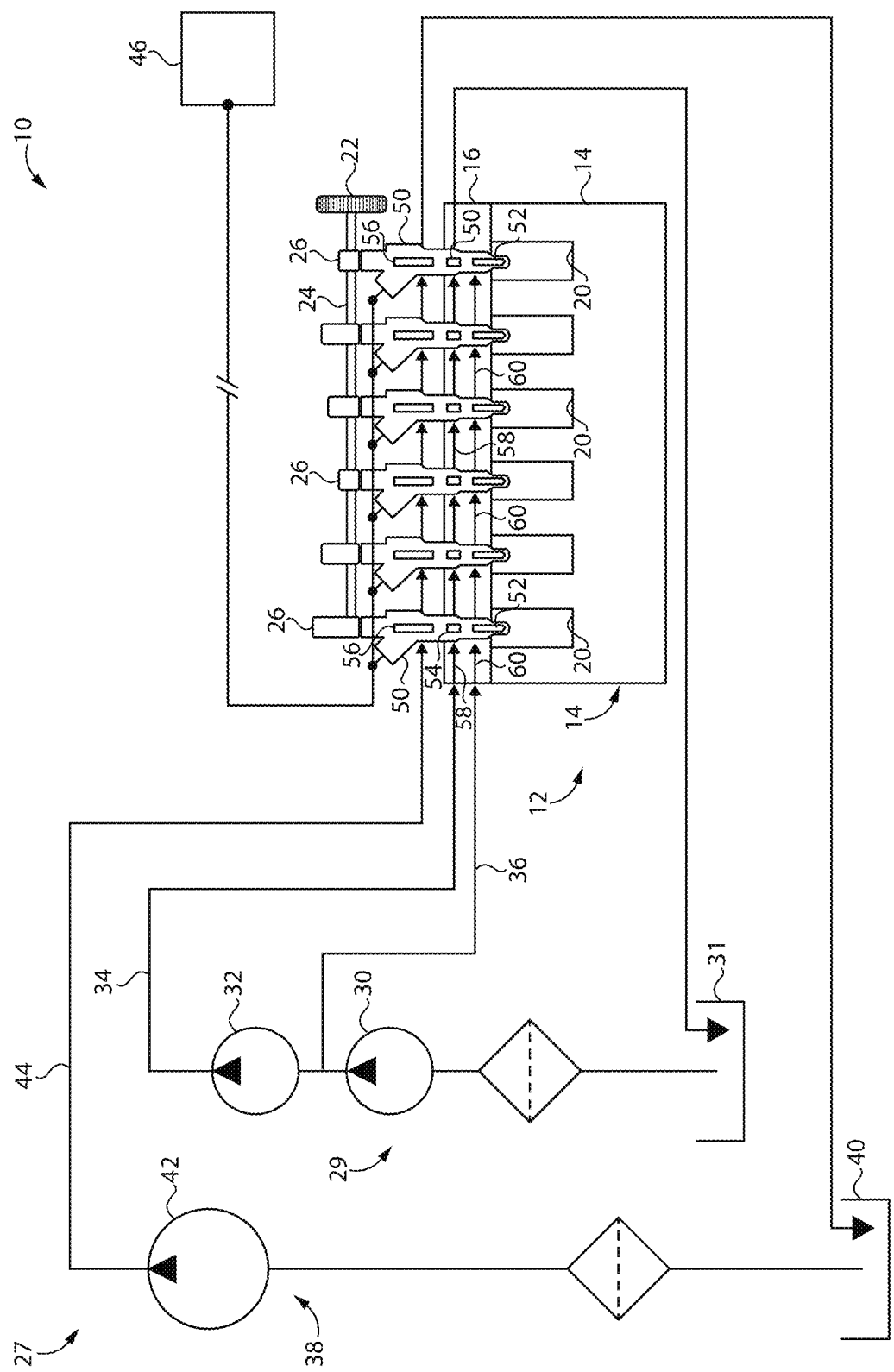
FIG. 1 is a diagrammatic view of an internal combustion engine system, according to one embodiment.

Referring to FIG. 1, there is shown an internal combustion engine system 12 according to one embodiment. Engine system 12 includes a dual fuel engine system having an internal combustion engine 12 with an engine housing 14. Engine housing 14 includes a cylinder head 16 attached to a cylinder block 18 having a plurality of combustion cylinders 20 formed therein. Cylinders 20 can include any number in any suitable arrangement such as an inline pattern, a V-pattern, or still another. Pistons are conventionally movable in cylinders 20 between a top-dead-center position and a bottom-dead-center position to rotate a crankshaft coupled to a load. Engine system 10 can be applied for operating an electrical generator, a pump, a compressor, or a drive line in a land vehicle or a marine vessel to name a few examples. Engine system 10 also includes a cam gear 22 in an engine geartrain coupled to a rotatable camshaft 24 having a plurality of cam lobes 26.

Engine system 10 also includes a dual fuel system 27. Dual fuel system 27 includes a first fuel subsystem 29 having a supply of a first fuel 31, at least one fuel pump 30 and 32, a high-pressure outlet conduit 34, and a low-pressure outlet conduit 36. First fuel subsystem 29 is configured to provide a feed of the first fuel at a high pressure and to provide a feed of the first fuel at a low pressure. In the illustrated embodiment, first fuel subsystem 29 includes a low-pressure pump 30, and a high-pressure pump 32 arranged in series with low-pressure outlet conduit 36 fluidly connecting between pump 30 and pump 32 and high-pressure outlet conduit 34 connecting to an outlet of pump 32. Various other strategies are within the scope of the present disclosure including two separate pumps arranged fluidly in parallel, a single pump having a high pressure outlet to provide high-pressure feed and coupled with a pressure-reducing valve to provide a low-pressure feed, or a variety of other arrangements. Any of the fuel pumps contemplated herein could be inlet-metered, outlet-metered, variable displacement, electrically powered, geartrain-driven, etc. Any strategy for providing the same first fuel at both a high pressure and a low pressure to engine 12 is within the scope of the present disclosure. Moreover, it should be appreciated that the terms "high" pressure and "low" pressure are used herein only in a relative sense, meaning that one pressure is higher than another, and not that any particular pressure levels or difference between pressure levels is intended, the significance of which will be further apparent from subsequent description.

In one implementation, the first fuel includes a compression-ignition liquid fuel such as a diesel distillate fuel. Alternatives can include a higher octane fuel blended with a cetane enhancer, or a variety of other fuels and fuel blends. The second fuel may include a higher octane liquid fuel, such as methanol. Alternatives can include methanol blended with other alcohols or other fuel types and fuel blends altogether.

Fuel system 27 further includes a plurality of fuel injectors 50. Each of fuel injectors 50, referred to hereinafter, at times, in the singular, is positioned to extend into a respective one of cylinders 20. Fuel injectors 50 can thus be understood as direct fuel injectors. Each fuel injector may include therein a nozzle check 52, a valve assembly 54, and a plunger 56. Plunger 56 may be cam-actuated in response to rotation of a respective one of cam lobes 26 to pressurize a fuel charge within the respective fuel injector 50 to an injection pressure, as further discussed herein. In other embodiments, a hydraulically-actuated fuel pressurization plunger might be used, or another fuel pressurization strategy altogether. A plunger might or might not be resident in a fuel injector, and in some embodiments a single plunger might be used to pressurize fuel for multiple injectors.

Also in the illustrated embodiment, the first fuel is fed from high-pressure outlet conduit 34 to a plurality of quill connectors 58 or the like supported in cylinder head 16. The first fuel may also be fed from low-pressure outlet conduit 36 to a plurality of passages 60 formed in cylinder head 16. Second fuel subsystem 38 may include a pump 42 and a second-fuel conduit extending between pump 42 and fuel injectors 50.

Engine system 10 also includes a control system 62 electrically connected to each of fuel injectors 50 and including any suitable computerized control unit having a data processor and a computer readable memory, for executing functions of operating fuel system 27 according to the present disclosure and potentially also for controlling and/or monitoring other aspects or components in engine system 10.

Referring also now to FIG. 2, there are shown features of fuel injector 50 in further detail. Fuel injector 50 includes an injector housing 64 forming a high-pressure fuel inlet 66, a low-pressure fuel inlet 68, a second-fuel inlet 70, and a plurality of nozzle outlets 72. High-pressure fuel inlet 66 receives a feed of the first fuel at a high pressure from high-pressure outlet conduit 34. Low-pressure fuel inlet 68 receives a feed of the first fuel at a low pressure from low-pressure outlet conduit 36. Second-fuel inlet 70 receives a feed of the second fuel from second fuel conduit 44 by way of pump 42 fluidly connected to second fuel supply 40.

As noted above, fuel injector 50 further includes a nozzle check 52. Nozzle check 52 is movable between a closed position blocking nozzle outlets 72, and an open position. Fuel injector 50 further has formed therein a combined-fuel outlet passage 76 formed between nozzle check 52 and injector housing 64. Valve assembly 54 is also positioned in fuel injector 50. Valve assembly 54 may include a first fuel admission valve 78 movable between a closed position blocking combined-fuel outlet passage 76 from high-pressure fuel inlet 66, and an open position. Valve assembly 54 also includes a second fuel admission valve 80 movable between a closed position blocking combined-fuel outlet passage 76 from second-fuel inlet 70, and an open position.

Fuel injector 50 further forms a plunger cavity 82, and includes cam-actuated plunger 56 movable in plunger cavity 82. Plunger 56 is coupled to a tappet 86 that is contacted by a respective one of cam lobes 26 during operation to cause plunger 56 to reciprocate in a generally conventional manner. As can also be seen from FIG. 2, a first-fuel feed passage 46 fluidly connects between low-pressure inlet 60 and one or more annuluses 48 extending circumferentially around plunger 56. A flow of the first fuel, such as diesel, to annuluses 48 can assist in lubricating and cooling plunger 56. Low-pressure fuel inlet 68 may be fluidly connected to one or more cavities in fuel injector 50, such as annuluses 48, with the one or more cavities and low-pressure fuel inlet 68 being not fluidly connected to combined-fuel outlet passage 76.

In a practical implementation, second fuel admission valve 80 includes a spool valve blocking plunger cavity 82 from second-fuel inlet 70 at the closed position. An inlet passage 83 for the second fuel extends through injector housing 64 between second-fuel inlet 70 and spill valve 80. Valve assembly 54 may be electrically actuated such as solenoid actuated, including a combined valve assembly package including both first fuel admission valve 78 and second fuel admission valve 80 as illustrated, but alternatively could include fuel admission valves separately packaged and in some instances located outside of injector housing 64. A nozzle supply passage 84 extends between plunger cavity 82 and combined-fuel outlet passage 76 to provide a feed of the second fuel pressurized via plunger 56 to combined-fuel outlet passage 76.

Injector housing 64 also includes a nozzle 88. In the illustrated embodiment nozzle 88 includes a tip piece or nozzle piece 90 in an injector stack 126, and has nozzle outlets 72 formed therein. Nozzle check 52 is movable in nozzle piece 90. A control chamber 92 is also formed in injector stack 126 and contains a volume of the first fuel exerting a closing hydraulic pressure on nozzle check 52 according to generally known techniques. In the illustrated embodiment first fuel admission valve 78 can be operated to admit the first fuel to combined-fuel outlet passage 76 for forming a fuel charge containing the first fuel therein. The fuel charge can be formed of both the first fuel and the second fuel, or of the first fuel only, or potentially only of the second fuel, as further discussed herein.

First fuel admission valve 78 can also be operated to control a closing hydraulic pressure in control chamber 92 to control a timing and potentially a manner of fuel injection. First fuel admission valve 78 may thus serve dual functions of admitting the first fuel to combined-fuel outlet passage 76 and also to directly control an opening and a closing of nozzle check 52, as further discussed herein. In an embodiment, first fuel admission valve 78 can be actuated open to admit the first fuel to combined-fuel outlet passage 76 during an off-cycle of fuel injector 50, such as when the respective cam lobe 26 is rotating on its base circle. When fuel injector 50 is not in an off-cycle, first fuel admission valve 78 can be operated to control fuel injection by varying a hydraulic fuel pressure in control chamber 92.

Referring also now to FIG. 3, a high-pressure fuel passage 94 extends through injector stack 126 and fluidly connects high-pressure fuel inlet 66 to a fuel volume 96. It will be appreciated that while the fuel pressure supplied to passage 94 is described as "high-pressure" the actual pressure level of the first fuel supplied might be variable. First fuel admission valve 78 is shown in FIG. 3 approximately as it might appear in the closed position, contacting a valve seat surface 98 and blocking fluid communication between fuel volume 96 and a nozzle supply passage 100 extending to combined-fuel outlet passage 76. Valve seat surface 98 is located fluidly between high-pressure fuel inlet 66 and combined-fuel outlet passage 76. As can also be seen from FIG. 3, a check valve 102 is positioned fluidly between valve seat surface 98 and nozzle supply passage 100.

Check valve 102 may be movable in response to incoming fuel pressure to a closed position, blocking nozzle supply passage 100, and may be spring-biased toward an open position, upward in the FIG. 3 illustration. Control chamber 92 may be in continuous fluid communication, irrespective of an open or closed state of check valve 102, with a passage 104 extending to an annulus 106 extending circumferentially around first fuel admission valve 78. A low-pressure drain passage 108 connects between a low-pressure space outside of injector stack 126, such as inlet 68, and a location fluidly between valve seat surface 98 and annulus 106. A valve edge 110 of first fuel admission valve 78 may be positioned to block low-pressure drain passage 108 when first fuel admission valve 78 is closed. When first fuel admission valve 78 is opened, valve edge 110 can permit fluid to flow from control chamber 92 to low-pressure drain passage 108. In this way, control chamber 92 can be selectively fluidly connected to low-pressure drain passage 108 to permit opening of nozzle check 52.

Referring briefly back to FIG. 2, in one implementation, nozzle piece or tip piece 90 forms nozzle outlets 72, and combined-fuel outlet passage 76 is defined between tip piece 90 and nozzle check 52. A fuel passage 114 may extend through nozzle check 52 to a plurality of transfer holes 116 fluidly connected to combined-fuel outlet passage 76. First fuel admission valve 78 may be located fluidly between high-pressure fuel inlet 66 and transfer holes 116.

Figure 4:
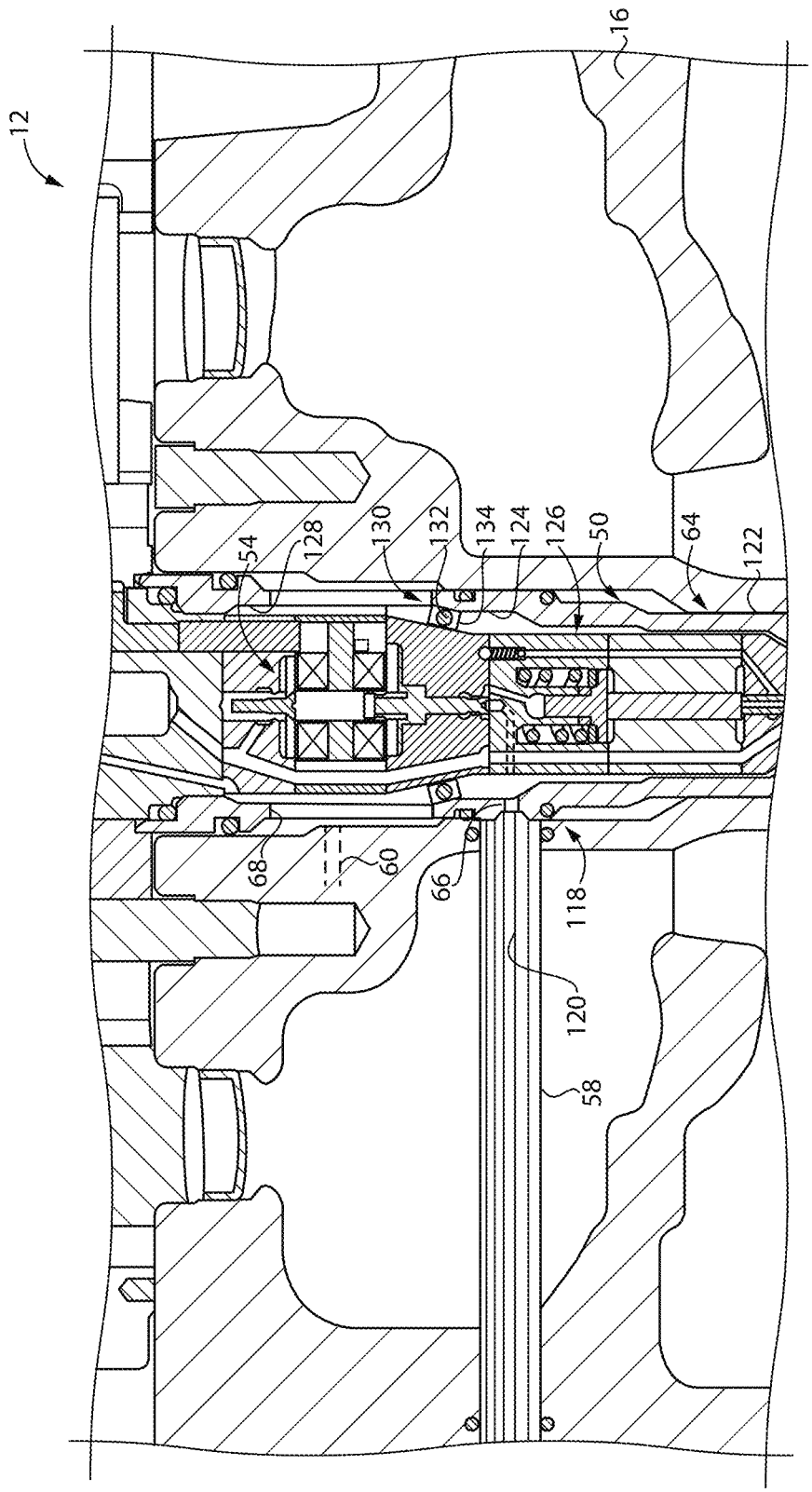
FIG. 4 is a sectioned side diagrammatic view through a portion of an engine in an engine system as in FIG. 1.

Referring now also to FIG. 4, there is shown fuel injector 50 in a fuel injector assembly 119 supported in cylinder head 16. Quill 58 forms a part of high-pressure outlet conduit 34 and also forms a quill passage 120 fluidly connecting to high-pressure inlet 66. Injector housing 64 may also include an injector case 122. A high-pressure fuel space or volume 124 is defined between injector case 122 and injector stack 126. A low-pressure fuel space or volume 128 is also defined between injector case 122 and injector stack 126. Fuel injector assembly 118 may further include a seal assembly 130 having a seal member 132 and a carrier 134 supported in injector housing 64 at a location between high-pressure fuel inlet 66 and low-pressure fuel inlet 60. In this way, seal assembly 130 can fluidly separate high-pressure volume 124 from low-pressure volume 128. Seal member 132 may include a conventional O-ring seal and carrier 134 may include an annular metallic piece structured to support seal member 132.

INDUSTRIAL APPLICABILITY

Referring to the drawings generally, operating fuel system 27 can include feeding the first fuel at a high pressure to high-pressure fuel inlet 66, feeding the first fuel at a low pressure to low-pressure fuel inlet 68, and feeding the second fuel to second-fuel inlet 70 in fuel injector 50. As discussed above, first fuel admission valve 78 can be operated to admit the first fuel to combined-fuel outlet passage 76. At times, first fuel admission valve 78 is operated during an off-cycle of fuel injector 50 when the respective cam lobe 26 is rotating on base circle to admit a relatively small volume of the first fuel so as to form a combined fuel charge, displacing some of the second fuel in combined-fuel outlet passage 76. Plunger 56 will generally not reciprocate during the off-cycle.

As the respective cam lobe 26 continues to rotate plunger 56 will be actuated, advancing and retracting in plunger cavity 82. During advancing plunger 56, second fuel admission valve 80 can be closed to permit pressure within plunger cavity 82 and connected passages in fuel injector 50 to build to an injection pressure. The combined fuel charge is then injected into a cylinder 20 for combustion, with the first fuel leading and the second fuel trailing. As discussed herein, a timing of a start of injection and a timing of an end of injection can be controlled via actuating first fuel admission valve 78, thus first fuel admission valve 78 serving dual purposes of controlling an admission of the first fuel and also controlling an injection timing of a fuel charge.

It may be desirable in certain instances to operate fuel system 27 and engine system 10 in a so-called "diesel-only" mode, where only the first fuel is admitted to fuel injector 50 to form a fuel charge. It has been observed in certain other system that the relatively short window of time for admitting the first fuel during an off-cycle of a fuel injector can limit an amount of the first fuel that can be admitted. Ultimately, this limitation on the volume of fuel that can be admitted can create a challenge to operating an engine system across its full theoretical load range. According to the present disclosure, at least when operating in a diesel-only mode the relatively high pressure of the first fuel supplied to high-pressure fuel inlet 66 enables a relatively greater amount of the first fuel to be rapidly admitted to form the fuel charge than what might be practicable otherwise.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A fuel system comprising:
   a first fuel subsystem including a supply of a first fuel, at least one fuel pump, a high-pressure outlet conduit, and a low-pressure outlet conduit;
   a second fuel subsystem including a supply of a second fuel;
   a fuel injector forming a high-pressure fuel inlet fluidly connected to the high-pressure outlet conduit, a low-pressure fuel inlet fluidly connected to the low-pressure outlet conduit, a second-fuel inlet, and a combined-fuel outlet passage; and
   the fuel injector further including a first fuel admission valve for the first fuel movable between a closed position blocking the combined-fuel outlet passage from the high-pressure fuel inlet, and an open position, and a second fuel admission valve for the second fuel.

2. The fuel system of claim 1 wherein the fuel injector further includes a nozzle piece forming a plurality of nozzle outlets, and a nozzle check movable to open and close the plurality of nozzle outlets, and the combined-fuel outlet passage is defined between the nozzle piece and the nozzle check.

3. The fuel system of claim 2 wherein a fuel passage extends through the nozzle check to a plurality of transfer holes fluidly connected to the combined-fuel outlet passage.

4. The fuel system of claim 1 wherein the high-pressure outlet conduit includes a quill connector.

5. The fuel system of claim 4 further comprising a sealing element forming a fluid seal between the low-pressure fuel inlet and the high-pressure fuel inlet.

6. The fuel system of claim 5 wherein the sealing element includes a seal member and a carrier.

7. The fuel system of claim 1 wherein:
the fuel injector forms a valve seat surface contacted by the first fuel admission valve at the closed position and located fluidly between the high-pressure fuel inlet and the combined-fuel outlet passage;
the fuel injector further forms a plunger cavity and includes a cam-actuated plunger movable in the plunger cavity; and
the second fuel admission valve includes a spill valve movable between a closed position blocking the plunger cavity from the second-fuel inlet, and an open position.

8. The fuel system of claim 1 wherein the fuel injector further forms a cavity fluidly connected to the low-pressure fuel inlet and not fluidly connected to the combined-fuel outlet passage.

9. A method of operating a fuel system comprising:
feeding a first fuel at a high pressure to a high-pressure fuel inlet of a fuel injector in the fuel system;
feeding the first fuel at a low pressure to a low-pressure fuel inlet of the fuel injector;
feeding a second fuel to a second-fuel inlet of the fuel injector;
operating a fuel admission valve to admit the first fuel to a fuel outlet passage in the fuel injector to form a combined fuel charge of the first fuel leading and the second fuel trailing; and
injecting the combined fuel charge into a cylinder in an engine for combustion.

10. The method of claim 9 wherein the operating the fuel admission valve includes operating the fuel admission valve to admit the first fuel at the high pressure to the fuel outlet passage.

11. The method of claim 9 wherein the forming the combined fuel charge includes displacing some of the second fuel in the fuel outlet passage with the admitted first fuel.

12. The method of claim 11 wherein the first fuel includes a compression-ignition fuel and the second fuel includes an alcohol fuel.

13. The method of claim 9 wherein the forming the combined fuel charge includes forming the combined fuel charge via feeding the admitted first fuel through a nozzle check of the fuel injector to the fuel outlet passage, and further comprising moving a spill valve in the fuel injector to a closed position, and advancing a plunger in the fuel injector while the spill valve is at the closed position to pressurize the combined fuel charge to an injection pressure.

14. The method of claim 9 further comprising feeding the first fuel at the low pressure through a cavity in the fuel injector not fluidly connected to the fuel outlet passage.

15. A method of operating a fuel system comprising:
feeding a first fuel at a high pressure to a high-pressure fuel inlet of a fuel injector in the fuel system, wherein the feeding the first fuel at the high pressure includes feeding the first fuel through a quill connector;
feeding the first fuel at a low pressure to a low-pressure fuel inlet of the fuel injector, wherein the feeding the first fuel at the low pressure includes feeding the first fuel through a fuel passage formed in a cylinder head of the engine;
feeding a second fuel to a second-fuel inlet of the fuel injector;
operating a fuel admission valve to admit the first fuel to a fuel outlet passage in the fuel injector to form a fuel charge containing the first fuel; and
injecting the fuel charge into a cylinder in an engine for combustion.

16. A fuel injector comprising:
an injector housing forming a high-pressure fuel inlet, a low-pressure fuel inlet, a second-fuel inlet, and a plurality of nozzle outlets;
the fuel injector further including a nozzle check movable between a closed position blocking the plurality of nozzle outlets, and an open position, and a combined-fuel outlet passage formed between the nozzle check and the injector housing; and
the fuel injector further including a first fuel admission valve movable between a closed position blocking the combined-fuel outlet passage from the high-pressure fuel inlet, and an open position, and a second fuel admission valve movable between a closed position blocking the combined-fuel outlet passage from the second-fuel inlet, and an open position.

17. The fuel injector of claim 16 wherein the fuel injector further forms a plunger cavity and includes a cam-actuated plunger movable in the plunger cavity, and the second fuel admission valve includes a spill valve blocking the plunger cavity from the second-fuel inlet at the closed position.

18. A fuel injector assembly including the fuel injector of claim 17, and further comprising a quill connector forming a fuel passage fluidly connected to the high-pressure fuel inlet.

19. The fuel injector assembly of claim 18 further comprising a seal assembly including a seal member and a carrier supported in the injector housing at a location between the high-pressure fuel inlet and the low-pressure fuel inlet.

* * * * *